United States Patent [19]
Roche

[11] Patent Number: 6,041,018
[45] Date of Patent: Mar. 21, 2000

[54] METHOD FOR CORRECTING AMPLITUDE AND PHASE DIFFERENCES BETWEEN TIME-LAPSE SEISMIC SURVEYS

[75] Inventor: Steven L. Roche, Sugarland, Tex.

[73] Assignee: Colorado School of Mines, Golden, Colo.

[21] Appl. No.: 09/191,567

[22] Filed: Nov. 13, 1998

Related U.S. Application Data

[60] Provisional application No. 60/065,222, Nov. 13, 1997.

[51] Int. Cl.[7] .................................................. G01V 1/28
[52] U.S. Cl. ........................... 367/46; 367/48; 340/15.5; 235/181
[58] Field of Search .................................. 367/40, 47, 48, 367/46, 63; 340/15.5; 235/181

[56] References Cited

U.S. PATENT DOCUMENTS

| | | | |
|---|---|---|---|
| 3,568,143 | 3/1971 | Naquin, Jr. .............................. | 340/15.5 |
| 3,756,683 | 9/1973 | Smith, Jr. ................................ | 350/3.5 |
| 4,348,749 | 9/1982 | Galbraith, Jr. ........................... | 367/46 |
| 4,405,999 | 9/1983 | Zachariadis .............................. | 367/23 |
| 4,691,306 | 9/1987 | Arens et al. ............................. | 367/40 |
| 5,132,938 | 7/1992 | Walters .................................... | 367/38 |
| 5,461,594 | 10/1995 | Mougenot et al. ...................... | 367/48 |
| 5,555,530 | 9/1996 | Meehan .................................... | 367/45 |
| 5,638,338 | 6/1997 | Peterson .................................. | 367/46 |
| 5,764,516 | 6/1998 | Thompson et al. ..................... | 364/421 |

*Primary Examiner*—Christine K. Oda
*Assistant Examiner*—Anthony Jolly
*Attorney, Agent, or Firm*—Holme Roberts & Owen LLP

[57] ABSTRACT

The present invention relates to a time-lapse or 4-D seismic data processing method in which cross-correlation of trace information in a series of time-lapse seismic images is used to distinguish one source of noise from another source of noise. After a source of noise has been identified, an appropriate filter is constructed to provide a correction to the noise produced by this particular source of noise. The data from one of the time-lapse seismic images is then applied to the filter to produce a corrected image. Differences between the corrected image and an uncorrected image are then used to determine time-lapse changes in the underlying geological structure. By being able to provide filters specifically tailored to correct each of the different types of noise present in a series of time-lapse seismic images, an accurate image of the time-lapse changes in the underlying geological structure is attained.

12 Claims, 15 Drawing Sheets

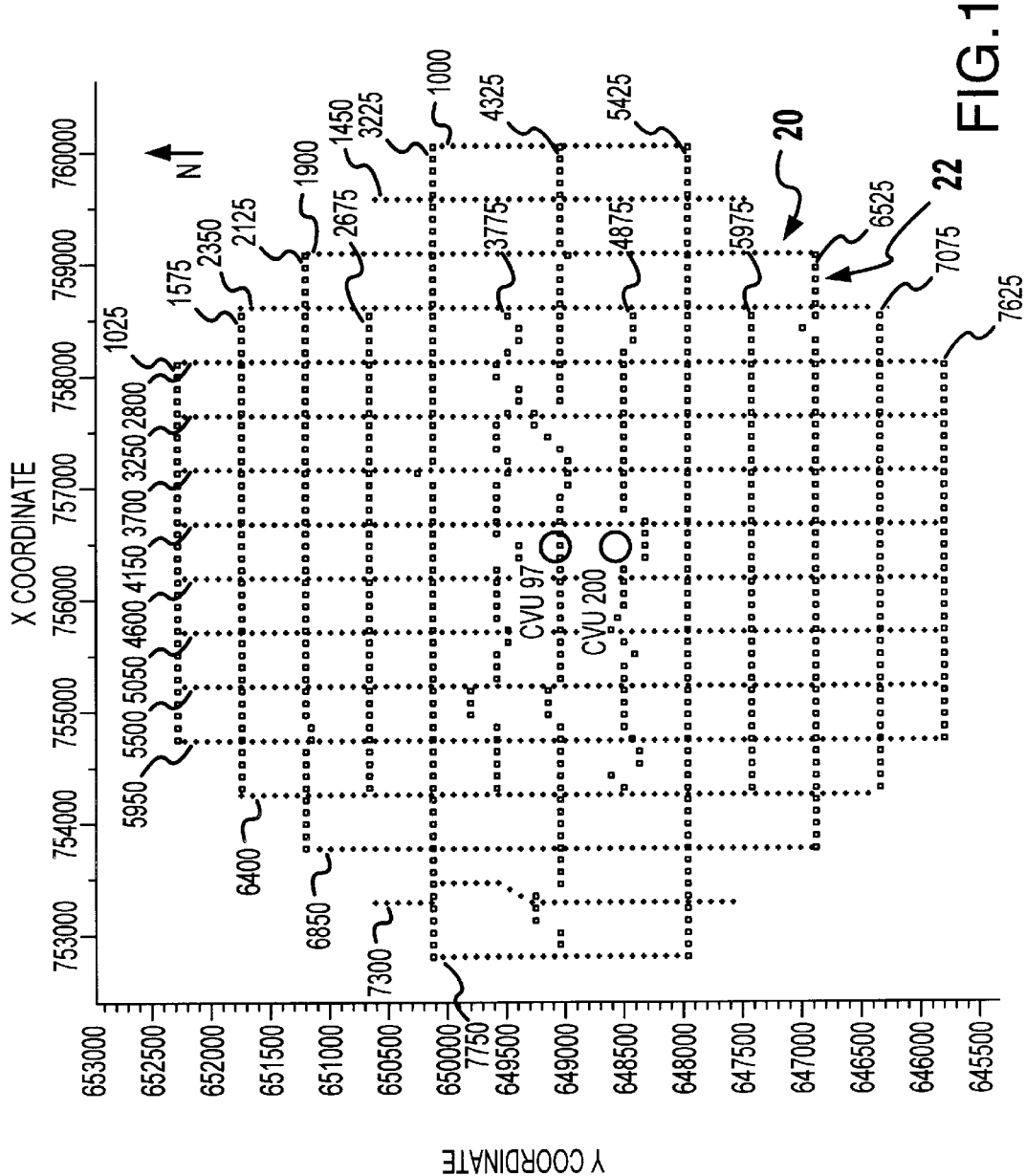

METHOD FOR CORRECTING AMPLITUDE AND PHASE DIFFERENCES BETWEEN TIME-LAPSE SEISMIC SURVEYS

CROSS REFERENCE TO RELATED APPLICATIONS

The present application claims priority from provisional application Ser. No. 60/065,222 filed Nov. 13, 1997.

FIELD OF THE INVENTION

The present invention relates to seismic data processing and, in particular, the processing of 4-D or time lapse seismic data.

BACKGROUND OF THE INVENTION

Seismic data is typically used to identify and/or characterize the geologic structures, such as oil and gas reservoirs, underlying the earth's surface. Seismic data is acquired by: (1) generating elastic wave energy at a multiplicity of locations at or near the earth's surface, or within the subsurface; (2) transmitting the generated elastic wave energy into the earth's subsurface where properties associated with the underlying geological structures affect (reflect and/or refract) the transmitted wave energy; and (3) recording the affected, elastic wave energy received at a multiplicity of receiver locations at or near the earth's surface, or within the subsurface. Seismic data processing methods apply a range of digital signal processing algorithms to the recorded data to produce an elastic wavefield image that delineates the effects of the underlying geologic structures upon the wave as the wave propagated through the earth's subsurface. These delineations are then used to draw conclusions about the underlying geological structures.

In many cases, the ability to manage the production of, for example, an oil reservoir is enhanced by an understanding of the ways in which the properties of the underlying geological structures associated with the reservoir have changed over time. For instance, the removal of oil from a location in a reservoir may have, over time, changed the elastic rock properties associated with that location of the reservoir. Knowing that these changes have occurred may be useful in identifying the location at which another well should be placed to realize better production from the reservoir than if the information had not been known.

To facilitate the acquisition of information on changes in the properties associated with subsurface geological structures of a particular volume of the subsurface, a first seismic image of the volume is produced, a second image is then produced at a later time, and the differences between the two images are used to infer changes in the properties of the underlying geological structures. This repeated acquisition of seismic data over time and comparison of the data obtained at different times is commonly referred to as time-lapse or 4-D seismic processing. Some of the rock properties that can change over time and affect elastic wave propagation characteristics include variations in fluid properties, fluid composition, fluid pore pressure, stress conditions and changes in porous rock framework and mineralogy.

The ability to detect these time-lapse changes in the properties of the underlying geologic structure, and to position them in their correct spatial location in the subsurface, is dependent on the magnitude of the changes and the presence of "noise" in the two images. Noise is the portion of the recorded data or signal that cannot be attributed to the properties of interest and, as such, tends to obscure the portion of the data or signal that is of interest. Consequently, the presence of noise can cause erroneous interpretation and inefficient management of, for example, an oil reservoir. A measure of the extent to which noise is obscuring the signal of interest is known as the signal-to-noise ratio. Noise can be in the form of random or semi-random vibrations at the source or receiver locations that is caused by ambient or cultural conditions. A second form of noise is the changes in elastic wave propagation characteristics that occur over time found in the earth's near-surface (the upper 50 to 300 meters). This second class of noise can be similar in appearance to the desired elastic wave signatures associated with monitoring fluids in the subsurface. A third form of noise is elastic wave propagation variations due to shallower reservoir production, or stress changes above or below a reservoir zone of interest.

Presently, there are two digital signal processing methods that are applied to seismic data in an effort to improve the signal-to-noise ratio in 4-D surveys and thereby provide a more accurate image of the changes to the sub-surface geological structures. The first method is the "surface-consistent processing of separate data volumes" method. Characteristic of this method is that the correction, which is accomplished with filters, is independently determined for each of the time lapse images. The usefulness of this method is limited to providing correction for changes in the propagation characteristics that occur over time in the earth's near surface. Corrections due to changes in propagation effects shallower than the reservoir zone in the subsurface are difficult to reconcile with this method. This method is further limited to situations in which there is a high signal-to-noise ratio at the outset. If the signal-to-noise ratio is low, the derivation of the correction filters will be contaminated. A low signal-to-noise ratio can be attributed to (1) a large noise signal relative to the signal relating to the changes of interest; or (2) a small signal relating to the changes of interest relative to the noise signal. A low signal-to-noise ratio in which there is a relatively large noise signal is the norm for seismic data. Further, a low signal-to-noise ratio in which there is a relatively small signal attributable to the changes of interest is becoming increasing important in efficiently managing oil reservoirs and the like. Stated differently, the ability to identify subtle changes, which produce relatively small signals, is becoming of increasing importance in managing oil reservoirs and the like. In sum, this method of processing time lapse seismic data, while useful, is of limited applicability.

The second method for improving the signal-to-noise ratio is the "post-stack or post-migration" method. Characteristic of this method is the production of a correction filter, often derived from cross-correlation of traces representing the same image trace, that is constrained to operate in the volume above the reservoir or modified by a smoothing or averaging function (matched filtering). The constrained or modified filter is then applied to one of the images to produce a corrected image. Local differences between the corrected image and the other image are interpreted to be related to rock property variations due to the reservoir processes of interest. However, the use of this method also has disadvantages. Namely, differences between the two surveys due to the type of noise associated with changes in the propagation characteristics that occur over time in the earth's near surface cannot be correctly reconciled after the stack or migration step that precedes production of the correction filter. Consequently, it is common practice to first apply surface-consistent processing to the data to address this source of noise and then apply the post-stack or post migration process to the data. Thus, further complicating the processing of the data. Further, because the type of noise associated with propagation effects shallower in the subsurface also cannot be correctly reconciled once the stack or migration step has occurred, the post-stack or post-migration method is of limited usefulness with respect to this type of noise. Additionally, this method is of limited use when there is a low signal-to-noise ratio in which there is a small signal relating to the changes of interest relative to the noise signal. Stated differently, the post-stack or post-migration method has limited ability to detect subtle changes. In sum, this method is also of limited applicability.

SUMMARY OF THE INVENTION

The present invention is directed to a method for processing time-lapse seismic images to provide an improved time-lapse image of changes in bulk rock properties. The invention provides the ability to identify and quantify the contribution of individual sources of noise. The ability to identify and quantify the contributions of individual source of noise, allows corrections to be made that are tailored to each of the individual sources of noise. These tailored corrections, in turn, yield a time-lapse image of the changes in bulk rock properties of the sub-surface volume of interest that has a higher resolution than the images provided by presently known methods of processing time-lapse seismic images. Stated differently, the method of the invention provides time-lapse images with a signal-to-noise ratio that is significantly better than that of the presently known methods for processing 4-D images. As a consequence, the invention provides the ability to not only get a more accurate image of the changes in bulk rock properties but also to identify very subtle changes in these properties, i.e., changes that produce a relatively small signal relative to the noise initially present.

In one embodiment, the invention cross-correlates trace pairs that are common to two images. To elaborate, in a survey, a seismic signal is generated at a source point, transmitted through the sub-surface, where it is altered by the sub-surface geological structures, and then recorded at, typically, several hundred to several thousand receiver locations. This process is repeated at several (typically, several hundred to several thousand) source points throughout the survey area. A trace is the signal recorded at a unique source location—receiver location combination. A common trace pair refers to the two signals recorded for the same unique source location—receiver location but in different surveys of the same area, i.e., in two different time-lapse surveys of the same area. The cross-correlated trace pairs are used to measure similarities between the time-lapse images. These similarities are then used to identify differences between the images. The differences are decomposed so as to be associated with different sources of noise. This decomposition is then used to tailor a correction to the noise contribution made by one or more of the sources of noise. The application of each correction reduces the noise and, as a consequence, improves the resulting time lapse image.

With respect to the removal of the contributions of particular sources of noise, a number of steps can be taken. A time-offset window above the reservoir zone of interest can be selected for comparison, i.e., the reservoir or sub-surface volume of interest can be excluded so that the noise contributions from sources of noise outside this volume are processed. Further, by averaging the cross-correlation wavelets in the common source domain, differences between the surveys due to local variations at that source location can be determined and corrected for in the data. Similarly, by averaging the cross-correlation wavelets in the receiver domain, common-midpoint domain, azimuth or offset domain, precise correction filters involving the amplitude and phase of the data can be derived to remove differences not associated with the bulk rock properties of reservoir or sub-surface volume of interest.

The method of the invention determines if the differences between one or more seismic surveys are due to the bulk rock property changes of interest or are attributable to sources of noise, such as the noise from local changes at the source and receiver positions, changes in the elastic wave propagation effects in the near-surface, and variations in the elastic wave propagation due to shallower reservoir production, and variations in wave propagation due to stress changes above or below a sub-surface zone of interest. Currently known methods of processing time-lapse images are more susceptible to contamination by noise and cannot differentiate between the causes of differences, thus tending to derive and apply general and imprecise correction filters.

BRIEF DESCRIPTION OF THE DRAWINGS

FIG. 1 is map view of a survey area and the source and receiver locations within the survey area;

DETAILED DESCRIPTION

Figure 1A:
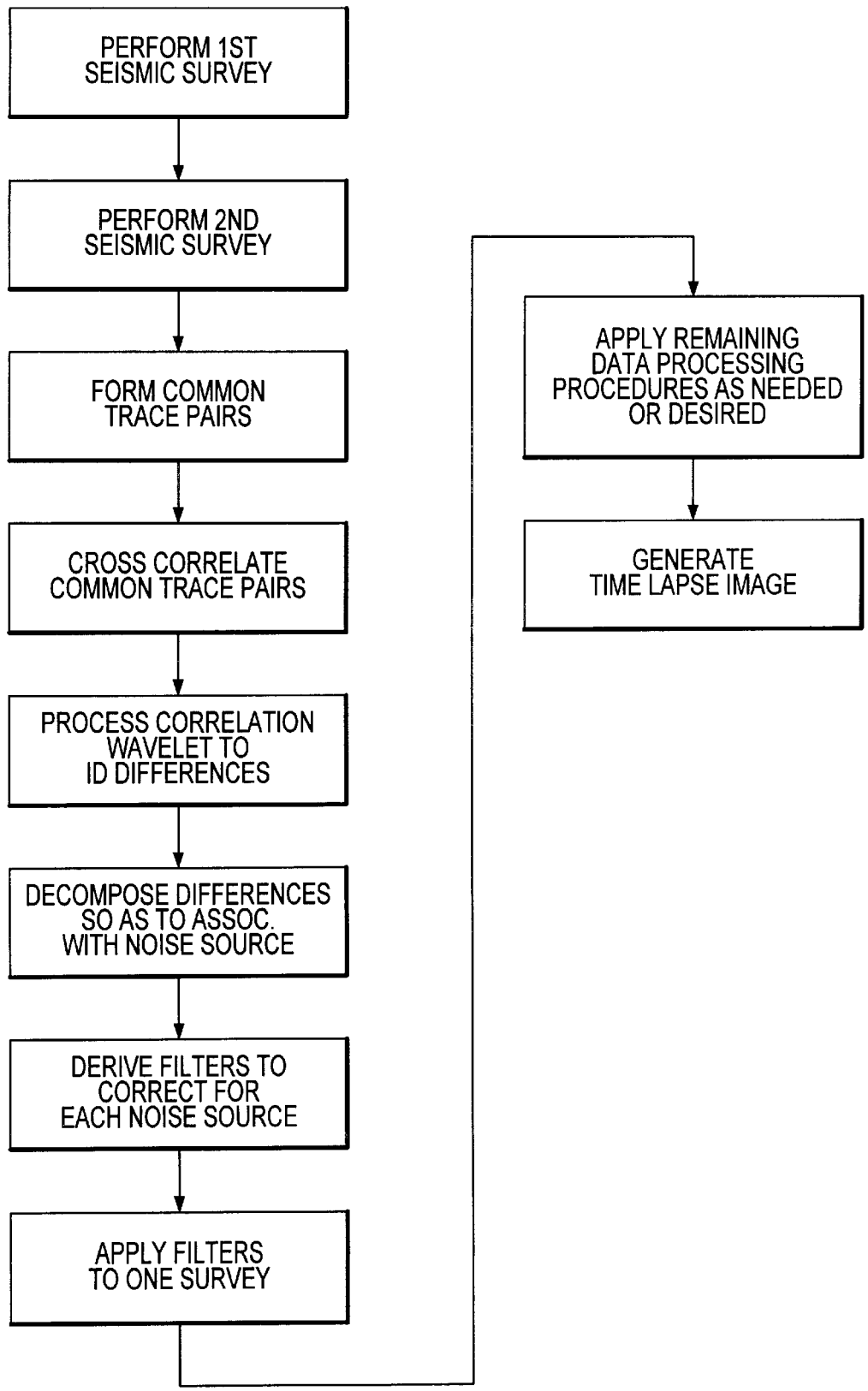
FIG. 1A is a flow chart of a method for deriving corrections for amplitude and phase differences between time-lapse seismic surveys.

This invention outlines a procedure for the derivation and analysis of cross-correlated, common source-receiver trace pairs in seismic data processing to: (1) measure, quantify and derive corrections for amplitude and phase differences between time-lapse seismic surveys; (2) obtain a measure of a spatially variant source, receiver, common-midpoint (CMP), azimuth and offset component amplitude spectra, in the presence of ambient noise, representing spatial and temporal wavelet distortion to be removed in data processing; and (3) obtain a measure of spatially variant source and receiver amplitude coupling scalars.

For time-lapse seismic surveys, data acquisition is repeated to obtain two or more recordings of seismic information over the survey area. The repeated surveys are separated in time during which some reservoir processes of interest (fluid injection, fluid withdrawal, pressure variation, fracturing, porosity redistribution, etc.) have occurred. These reservoir processes induce bulk rock property changes which affect seismic wave propagation and can be detected to infer information about the reservoir processes.

The objective of the seismic data acquisition procedures is to record closely identical sets of seismic data. Controllable parameters such as source and receiver location, orientation, coupling and instrumentation are carefully implemented to provide a repeatable data set. The purpose of the acquisition is to generate and record seismic energy along the same propagation paths for both surveys, with the same source and receiver characteristics.

Variations in the data acquisition procedures, changes in ambient noise levels, changes in the material properties of the earth's near surface and even variations in the rock properties above the reservoir zone of interest are all forms of distortion, or noise, to be attenuated in data processing. It is desirable to estimate and remove these distortions, thus improving the time-lapse image of the changes in bulk rock properties due to the reservoir processes of interest.

This invention utilizes the common trace pairs recorded between the two or more seismic surveys. In a typical three-dimensional seismic survey, each source point of seismic energy is recorded at several hundred to several thousand individual receiver locations. The source point is relocated and the procedure is repeated. When considering the entire recorded data volume, there is tremendous redundancy of trace information. Each "trace" of recorded data represents seismic information for that unique source location—receiver location combination and, as such, is commonly referred to a trace pair. For repeated seismic surveys, there are duplicate recordings for the same source—receiver location combination, or common-trace pair.

In the example of the Colorado School of Mines Reservoir Characterization Project Phase VI survey, there are approximately 0.5 million trace pairs available for analysis. FIG. 1 shows the map view of the source and receiver locations in the survey area. There are 836 receiver locations 20, aligned along north—south receiver lines, recording three components of particle velocity at the earth's surface. The 616 source locations 22 are aligned east—west, with each source point having been recorded with vertical, north-south and east-west forces applied to the ground surface. The resulting volume is a multi-component (3-C), three-dimensional (3-D) seismic survey. A second survey was acquired six weeks later, to produce the time-lapse, or 4-D, aspect for this project. The source and receiver locations were reoccupied for this second, or repeat survey.

With reference to FIG. 1A, the processing method for deriving corrections for amplitude and phase differences between time lapse seismic surveys is discussed. The processing method cross-correlates each common-trace pair. The cross-correlation contains information about the common amplitude spectrum and phase difference of the trace pair, plus noise contamination. By decomposing these correlation wavelets into source, receiver, common-midpoint, azimuth or offset components, the differences between the surveys can be estimated and a correction derived. The method derives these estimates from a time-offset window separate from the reservoir zone to exclude the changes due to the reservoir processes of interest. Once the corrections are derived, essentially one of the time-lapse volumes is corrected to the other. Ideally the two data volumes are identical, except for the different seismic response associated with the reservoir zone and the bulk rock property variations due to the reservoir processes. Remaining data processing procedures are performed on one volume but the results thereof are applied to both volumes to increase resolution while maintaining consistency. This prevents the application of data dependent processes which can induce undesirable variations between the surveys. The remaining data processing and analysis procedures could include CMP stack, DMO (Dip Move Out) post-stack migration, pre-stack migration, inversion (pre-stack or post-stack), differencing, attribute analysis, multi-component rotation, hodogram analysis, azimuthal velocity analysis and AVO (Amplitude Versus Offset) analysis. All of the above procedures could be applied to one or more components of a multi-component 4-D seismic survey. At this point, differences in data attributes from the reservoir zone are interpreted to infer changes in bulk rock properties due to reservoir processes.

Figure 2:
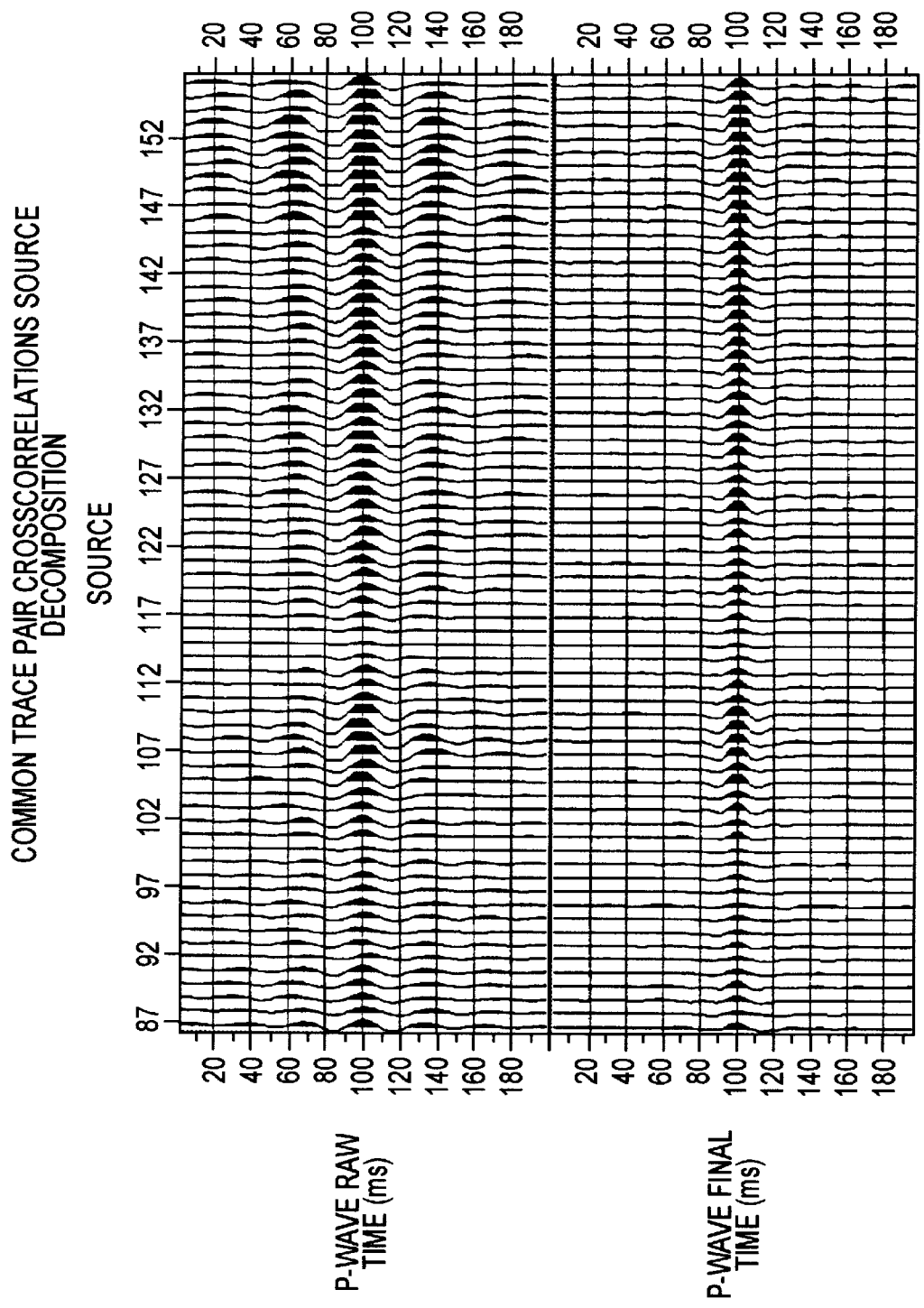
FIG. 2 illustrates p-wave data for a common trace pair after decomposition into a source component before correction and after correction.
Figure 3:
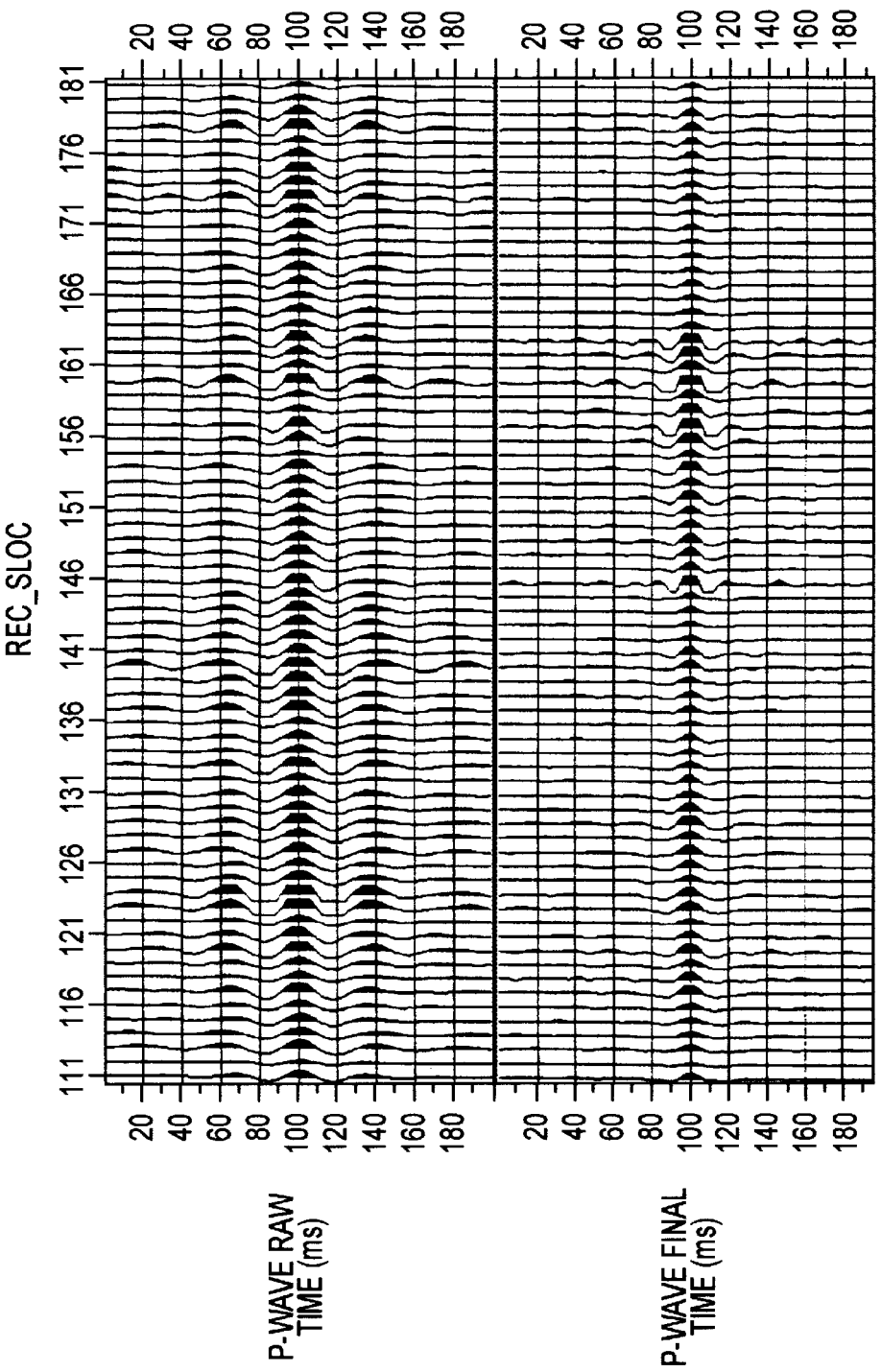
FIG. 3 illustrates p-wave data for a common trace pair after decomposition into a receiver component before correction and after correction.

Repeating the trace pair correlation and decomposition into source, receiver and common midpoint domains after application of the correction filters, provides a quantitative measure of the success of the method. The base repeatability of the 4D data volume is improved, allowing interpretation of the differences at the reservoir zone to infer changes in reservoir production characteristics. With respect to the time-lapse surveys noted with respect to FIG. 1, the application of the method used decomposition into source and receiver components for the corrections. FIGS. 2 and 3 show examples for the p-wave data of the common-trace pairs after decomposition into source and receiver components. The upper row of trace data in each figure represents the data before the correction, and the bottom row is after the application of the source and receiver domain correction filters.

There are immediate applications for this invention. For time-lapse (or 4-D) seismic surveys, this invention provides a method to derive and remove amplitude and phase differences between the repeated surveys caused by processes other than the bulk rock property changes due to the reservoir processes of interest. This invention can be applied to conventional single-component or multi-component seismic surveys (p-wave data volumes, p to s converted wave volumes and shear to shear wave data volumes). The same principle of this invention can be applied to verify the correct application of the applied amplitude and phase corrections in a domain different than the domain(s) of application.

This method provides a means to specifically control the processes applied to time-lapse seismic data in order to remove or attenuate the differences between the resulting seismic images due to changes in data acquisition characteristics (source coupling, source phase, receiver coupling, receiver phase), variations in ambient noise levels, changes in data acquisition parameters (source and receiver location and orientation) and changes in the near surface properties affecting seismic wave propagation. The remaining differences in the seismic images can then interpreted to be caused by bulk rock property variations due to the reservoir processes of interest. The method of cross-correlating the common trace pairs between the time-lapse surveys derives corrections to the amplitude and phase of the data in order to improve the resulting image.

With respect to the estimation of spatial and temporal wavelet distortion, the method of cross-correlating trace pairs is extended so as to reduce the contribution of the ambient noise to the resulting amplitude and phase spectrum estimate. In areas of high ambient noise, or areas where desirable higher frequency content is contaminated by ambient noise, this method provides a more robust estimate of the amplitude and phase spectra signatures decomposed by source, receiver, common-midpoint and offset. These more robust estimates are used as input to appropriate deconvolution algorithms. For low signal to ambient noise ratios, this method provides a more accurate estimate of the spectra. This method can be applied to time-lapse data volumes or to conventional "singular" surveys if pairs (or more) of individual source recordings are saved at each source point. Typically for an onshore vibrator or non-dynamite impulsive source survey, there are multiple source events taken at each source point but conventional data acquisition procedures immediately sum all events from a given source point prior to recording on storage media.

The method uses the common trace pair cross-correlations to estimate a spatially or temporally varying amplitude spectrum in the presence of relative high ambient noise levels. The resulting amplitude spectra are then used to derive deconvolution operators to remove the attenuative effects of wave propagation through an dissipative medium. The common trace pair correlation method correctly estimates the desired spectrum and provides a level of attenuation against the ambient noise spectrum. The level of attenuation is based on the source parameters (impulsive or vibrator) and the number of common trace pairs available to be summed in the desired domains. In contrast, current technology employs either trace autocorrelation or single trace estimate of power spectra to derive the noted spatially or temporally varying amplitude spectra. Since the spectral estimate is often measured in the presence of relatively high ambient noise levels, application of current technology in such an environment contains a contamination in the form of the noise spectrum superimposed on the desired spectrum.

Figure 4:
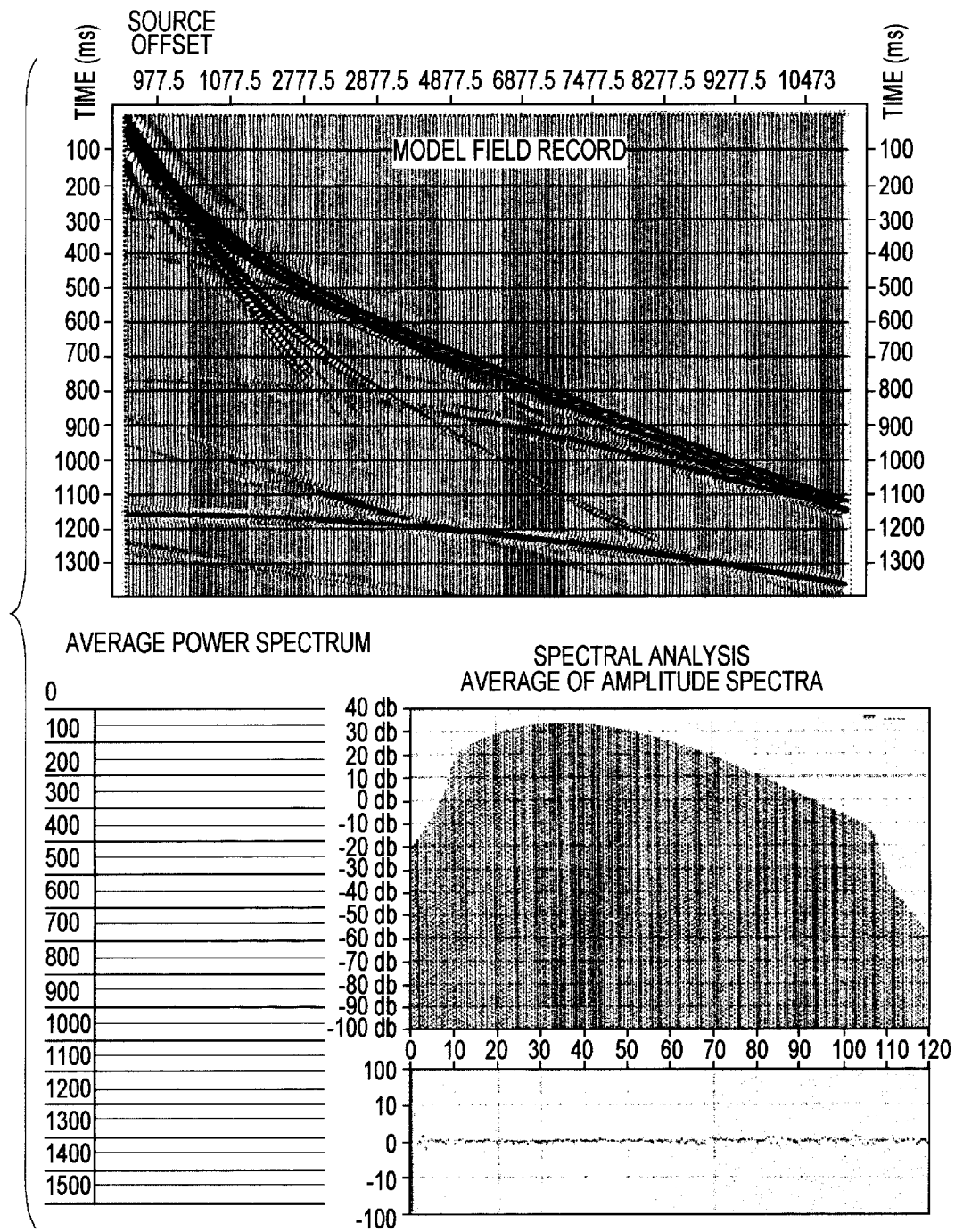
FIG. 4 illustrates a synthetic, non-zero offset, seismic field record and a conventionally derived estimate of the seismic source spectrum.
Figure 5:
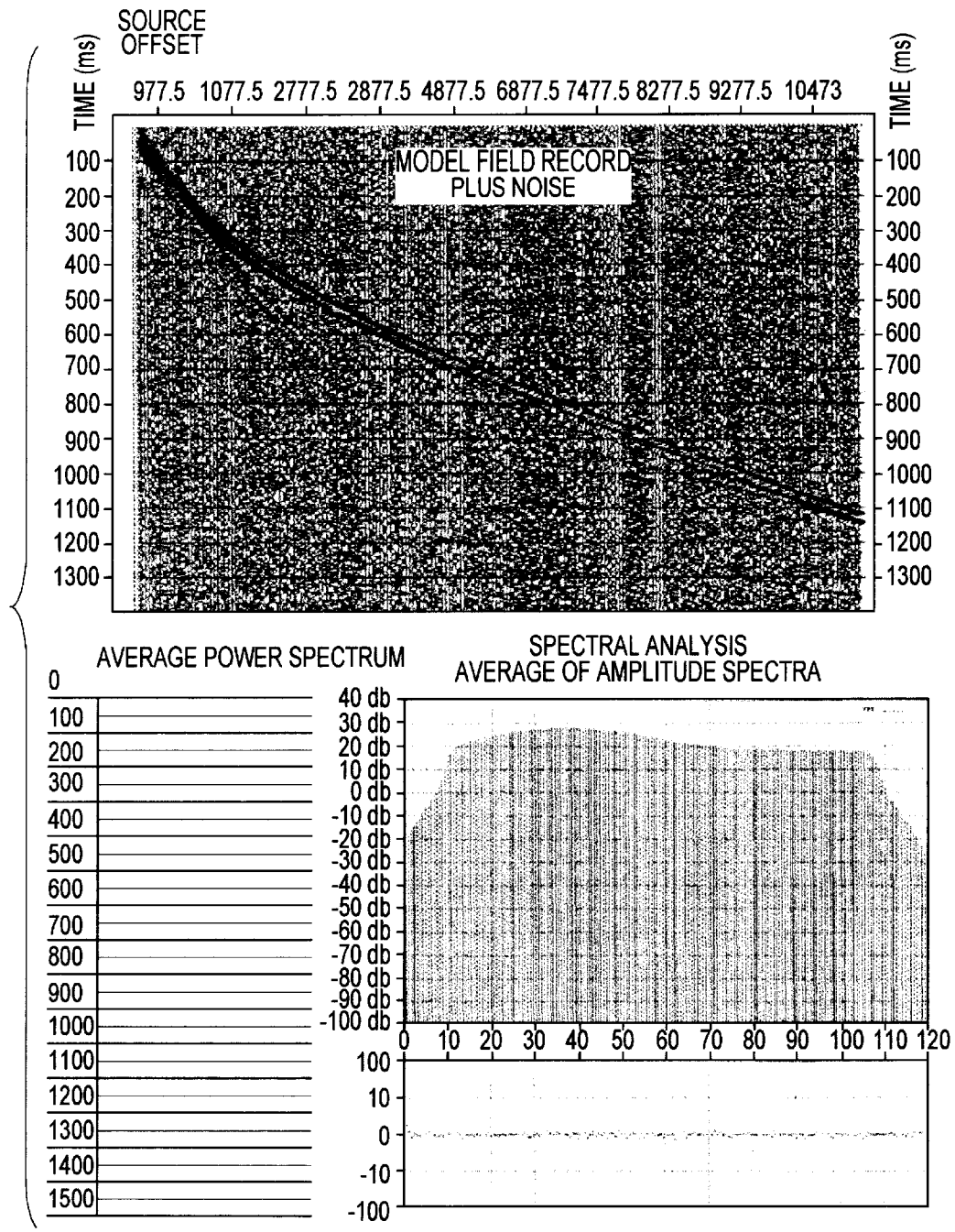
FIG. 5 illustrates the same seismic field record of FIG. 4 but with a first set of random noise superimposed on the data and a conventionally derived estimate of the seismic source spectrum that is contaminated due to the presence of noise in the data.
Figure 6:
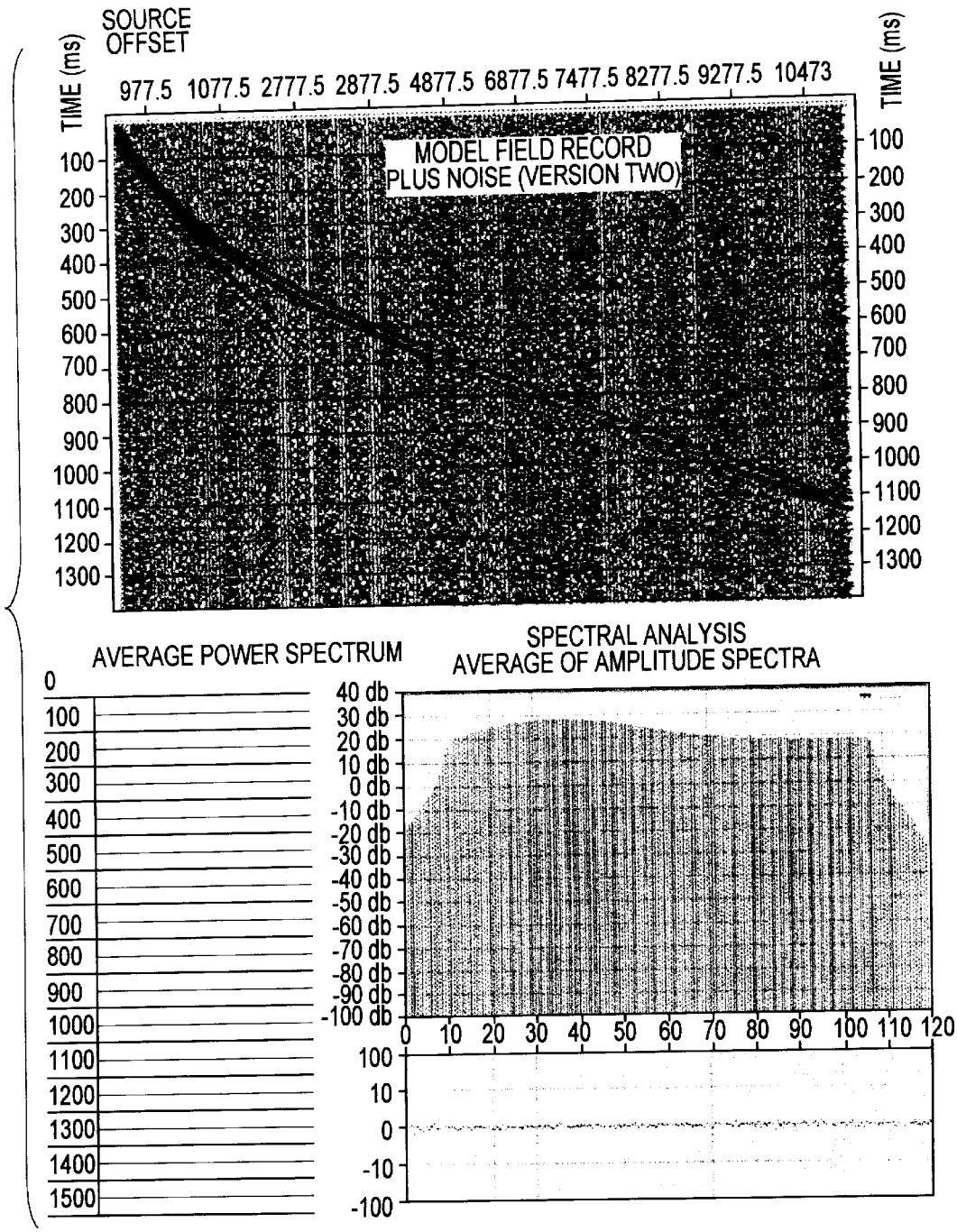
FIG. 6 illustrates the same seismic field record of FIG. 4 but with a second set of random noise superimposed on the data and a conventionally derived estimate of the source spectrum that is contaminated due to the presence of noise in the data.
Figure 7:
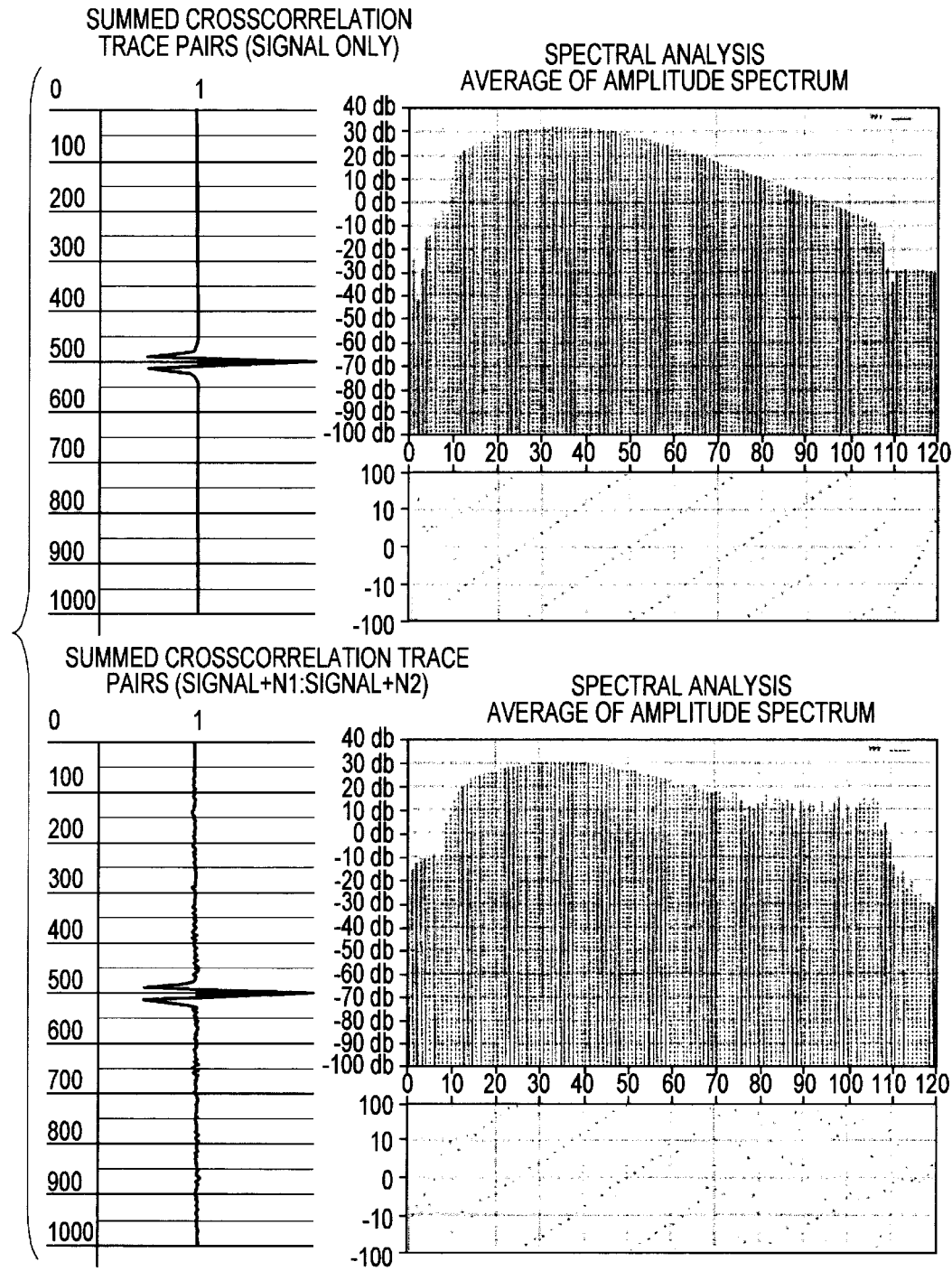
FIG. 7 illustrates the correct source spectrum and the source spectrum derived from trace pair cross-correlation.
Figure 8:
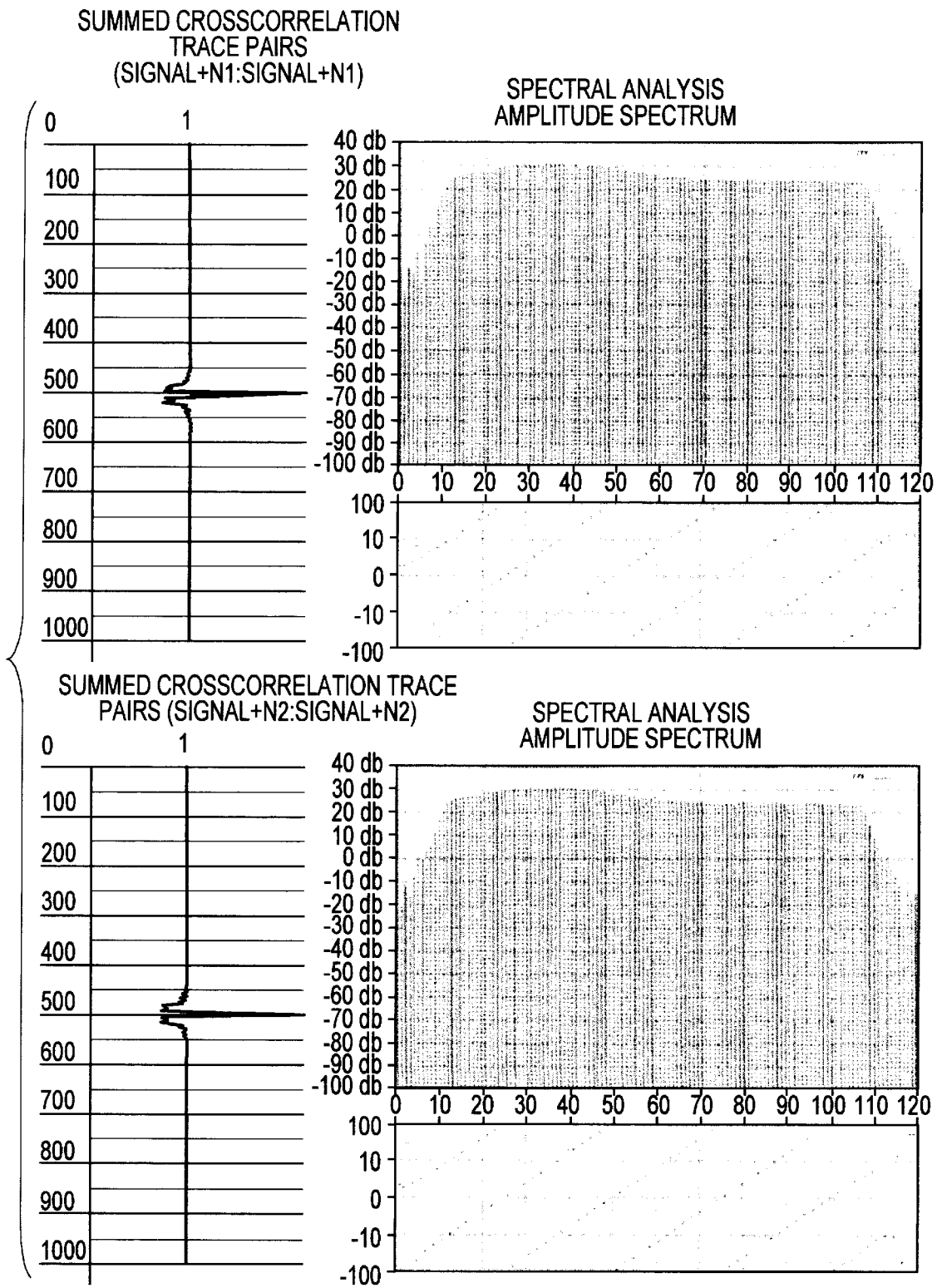
FIG. 8 illustrates source spectrum derived by known conventional processes.

FIGS. 4 through 8 illustrate the results of a model study that uses the methodology discussed above. FIG. 4 shows a synthetic, non-zero offset, seismic field record with a conventionally derived estimate of the seismic source spectrum. For this noise-free example, the derived source spectrum obtained by averaging each trace pairs autocorrelation (one of the current approaches), is accurate. FIGS. 5 and 6 are the same synthetic field record, except each record has a separate set of random noise superimposed on the data. The conventionally derived estimate of the source spectrum is now contaminated. These data represent the realistic effects of ambient noise present during the recording of seismic data. FIG. 7 shows the correct source spectrum estimate (top) and the spectrum derived from the common-trace pair cross-correlation method (bottom). Approximately 12 to 15 db of random noise attenuation has been provided by this application when compared to the conventional estimates shown in FIG. 8. The conventional source spectrum estimates have been contaminated by the autocorrelation of the noise in the data.

With respect to the measuring of spatially variant source and receiver amplitude coupling scalars, the method of cross-correlation is further extended to the analysis of adjacent trace-pairs within a seismic survey to estimate and derive corrections for source and receiver coupling scalars. To elaborate, cross-correlation followed by summing reduces the effect of ambient noise on the coupling scalar estimations.

The following discussion is an example of the use of cross-correlation methodology discussed above in: (1) deriving corrections for amplitude and phase differences between time-lapse seismic surveys; and (2) estimation of spatial and temporal wave distortion. This methodology has been applied to the 4-D, 3-C data volume acquired and processed for the Colorado School of Mines, Reservoir Characterization Project, Phase VI. The cross-correlation of common trace pairs was performed for the fast (S1) and slow (S2) shear wave components, then decomposed into source and receiver spectra estimates for the design and application of surface consistent deconvolution. Conventional methods used to decompose the source and receiver spectra were more susceptible to contamination by ambient noise.

For both the p-wave and s-wave data volumes, the cross-correlation of common trace pairs was used to measure, quantify and derive corrections for intra-survey linear phase corrections (time shifts), decomposed into source and receiver components. Results from the p-wave data volumes are shown in FIGS. 2 and 3.

Figure 9:
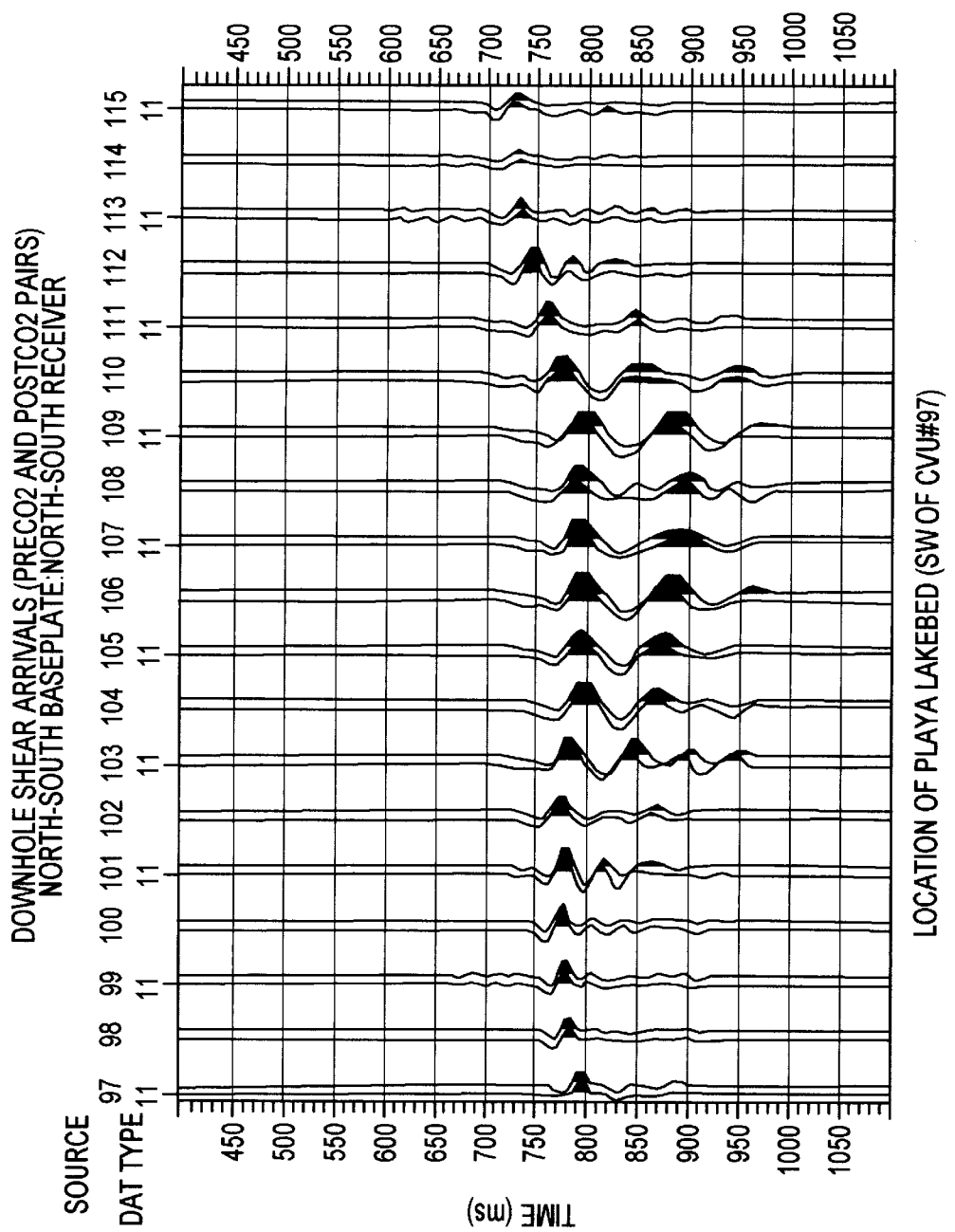
FIG. 9 illustrates downhole 3-C phone arrivals from a vibratory source imparting north-south baseplate motion.
Figure 10:
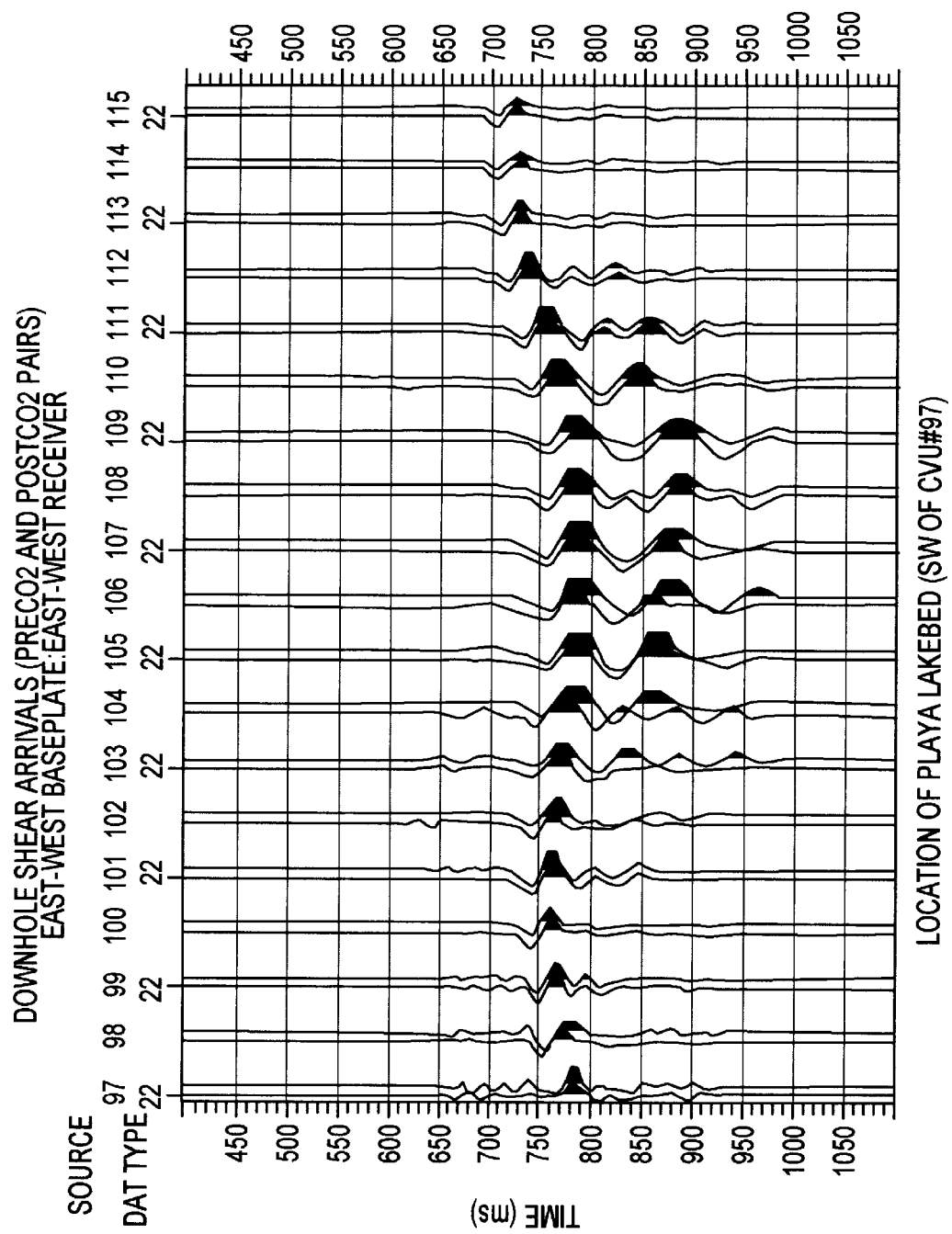
FIG. 10 illustrates downhole 3-C phone arrivals from a vibratory source imparting east-west baseplate motion.
Figure 11:
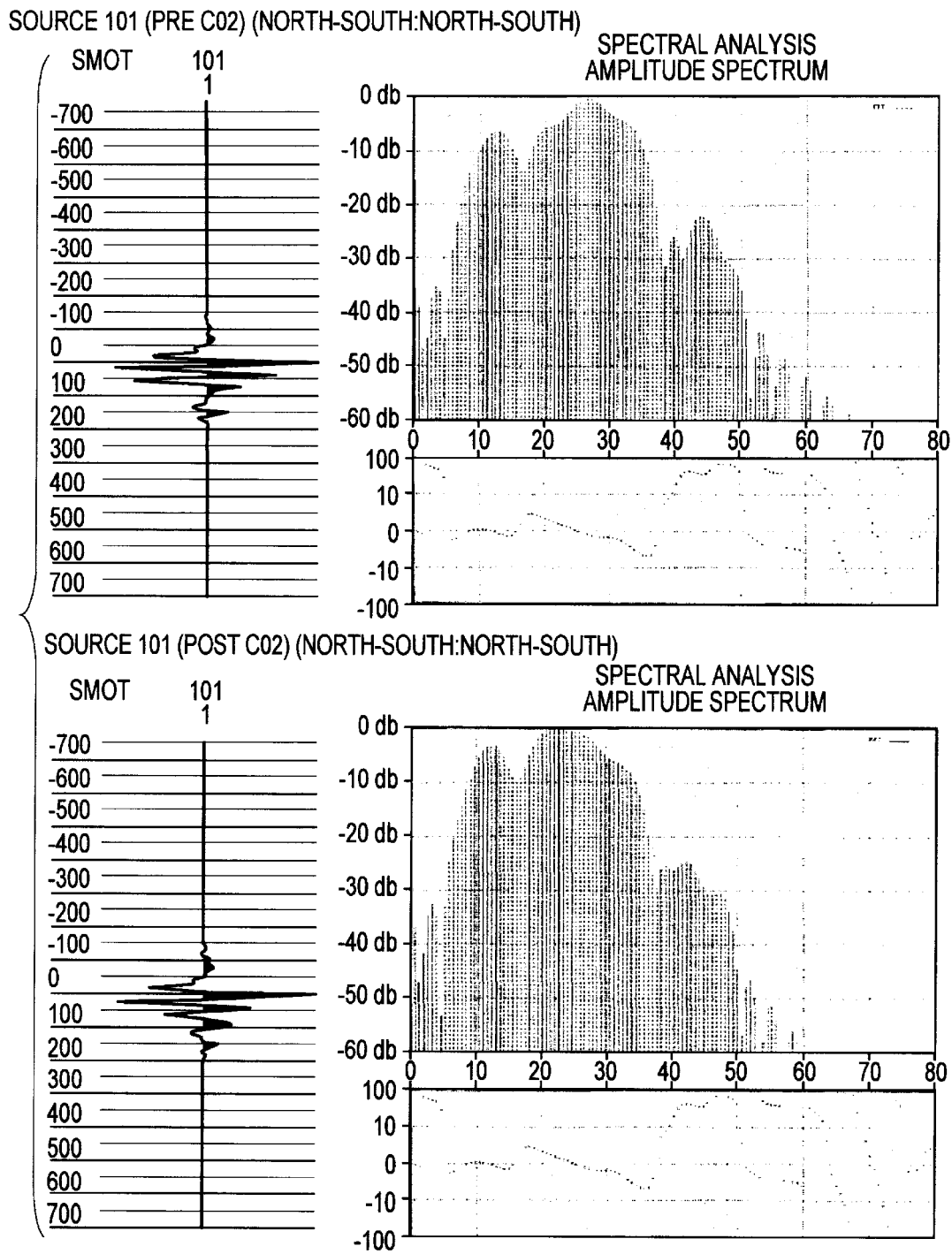
FIGS. 11 and 12 respectivley illustrate the amplitude spectrum for a source location for the inital and repeat north-south survey and the initial and repeat east-west survey.
Figure 12:
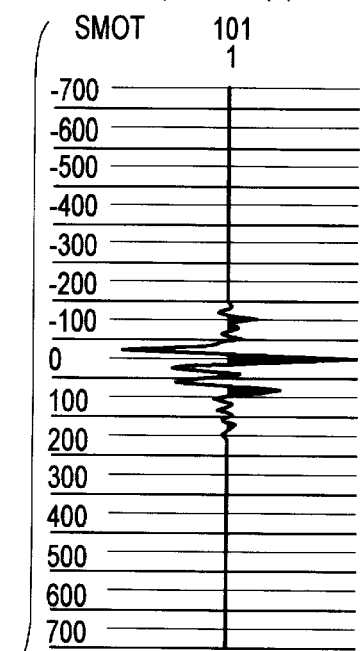
Figure 12:
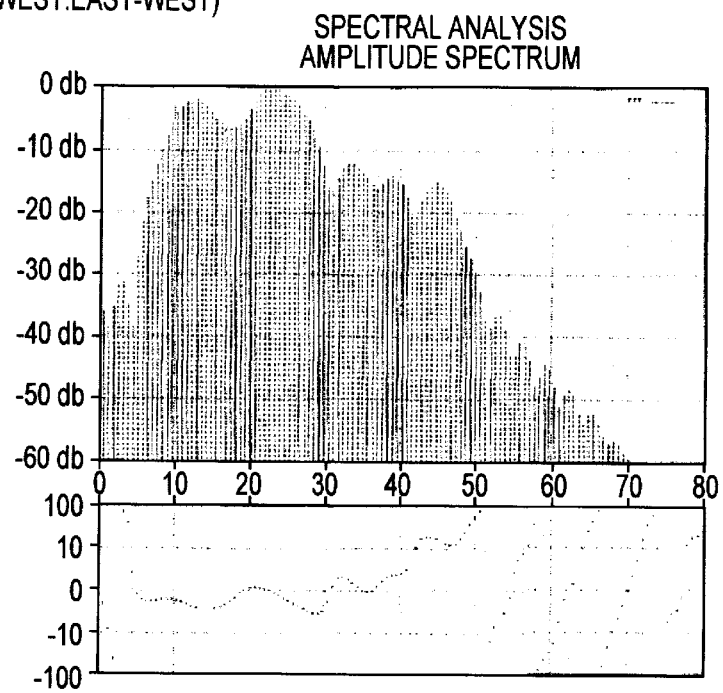
Figure 12:
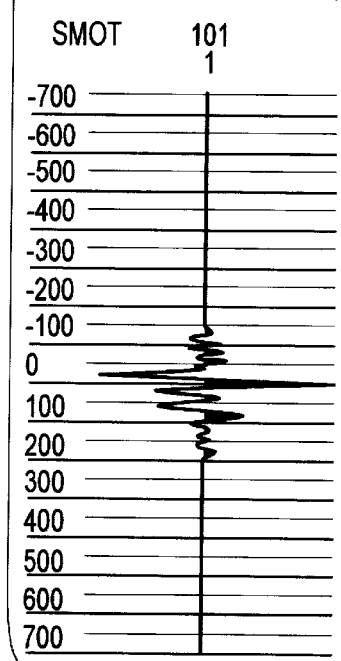
Figure 12:
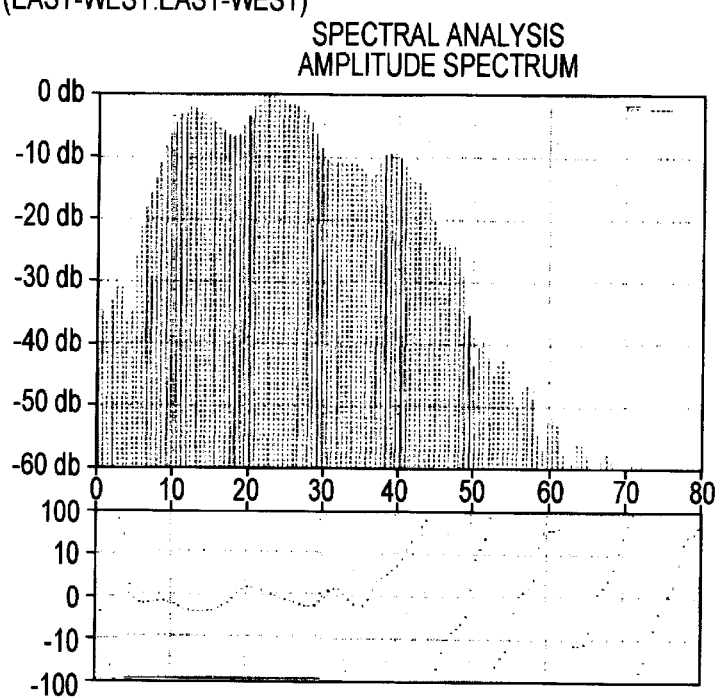

FIGS. 9 and 10 demonstrate two aspects of seismic wave propagation in time-lapse, three dimensional (4-D), three component (3-C) seismic surveys. The two aspects are the repeatability of the downgoing waveform from a given source location and the spatially varying distortion of the downgoing waveform as the source location is varied. The common-trace pair cross-correlation method provides a means to measure and ensure repeatability and provides a technique to measure spatially varying near-surface wavelet distortion in the presence of ambient noise. FIG. 9 shows downhole 3-C phone arrivals at the −3300 depth from a vibratory source imparting north-south baseplate motion. Source points 97 through 115 traverse a playa lakebed in the survey area. The rock properties of the near-surface vary across the playa lakebed which affect the characteristics of wave propagation from the seismic sources. For each source point a pair of traces is displayed, initial and repeat surveys. A significant time delay and change in frequency content is evident for both the initial and repeat traces as the source location traverses the changes in the near-surface rock properties associated with the playa lakebed. This example demonstrates the need for deconvolution to remove near-surface distortion. The similarity between the initial and repeat seismic surveys is apparent. FIG. 10 is the same source line traverse imparting east-west baseplate motion. A 250 msec window on the first arrivals was applied and an amplitude spectrum calculated. FIGS. 11 and 12 show the amplitude spectrums for source location 101, for the initial and repeat surveys (north-south baseplate motion and east-west baseplate motion).

The analysis method cross-correlates the common-trace pairs between the initial and repeat surveys. Since the data acquisition design had co-located source and receiver points, there is significant redundancy. There are over 500,000 pairs of traces available for cross-correlation. A time window was selected which excludes reflected energy from the San Andres reservoir and below. By using this window (assuming no bulk rock property variations except for near surface) the propagation effects can be common-moded to derive the phase difference and common amplitude spectrum of the cross-correlations. These individual cross-correlations can be decomposed into source, receiver, CMP, offset and azimuth components. In this case, the source and receiver decomposition was used to derive phase shift filters between the two surveys in a surface consistent manner. For these data the phase difference was essentially a linear phase shift or time difference.

The amplitude spectrum from the common-trace pairs cross-correlations presented a method for estimating a source or receiver amplitude spectrum for use in surface-consistent deconvolution operator design. Since the two seismic surveys were acquired six weeks apart, there are different ambient noise characteristics. Common-trace pair cross-correlation provides attenuation of the ambient noise portion of the spectrum. Decomposition into source, receiver, CMP, offset or azimuth provides a second level of attenuation of the ambient noise. This method was used for the shear wave data due to the high ambient noise levels.

Determining an amplitude spectrum for deconvolution using the method of common trace-pair cross-correlation was used in the Colorado School of Mines Reservoir Characterization Project Phase VI study. The shear wave surface consistent deconvolution used these spectral estimates to remove the spatially variant, time invariant source and receiver distortion present in the shear wave data.

In the presence of velocity anisotropy, a propagating shear wave will split (birefringence) into a fast and slow component. This shear wave splitting can be detected using multi-component seismic methods. The amount of birefringence depends on the amount and geometry of the anistropy. For the Phase VI data volume, the majority of shear wave splitting occurred within 1500 feet of the earth's surface. Different forms of shear wave propagation resulted, primarily determined by the angle of wavefront propagation measured with respect to vertical. Within angles of zero to twenty degrees, the shear wave split into two, approximately horizontally polarized waves, S1 and S2. Beyond twenty degrees, the shear waves propagate in a vertically polarized mode (SV) and horizontally polarized mode (SH). Each of these four wave modes can suffer different forms of distortion which can be removed using deconvolution methods.

The method of common trace-pair cross-correlation can provides a more robust estimate of the amplitude spectrum for any mode of shear wave propagation, provided the specific mode can be isolated based on time-space windowing and polarization. Different modes may require different approaches to deconvolving the distorting effects of the near-surface. An example would be transverse isotropy where the two waves types, distinguished by polarization in the symmetry plane and perpendicular to the symmetry plane, may undergo different degrees of distortion. A physical example could be a vertically transverse isotropy due to thin horizontal layering in the near-surface. In this case, the SV shear wave and SH shear wave would suffer different degrees of distortion due to the near surface as offset or propagation angle from vertical increases.

Within the RCP Phase VI study, the S1 and S2 volumes were deconvolved separately, although some discussion of deconvolving S1 and S2 as a single volume for small angles from vertical is appropriate. The result is that a single set of surface consistent deconvolution operators (source and receiver) are designed from the corrected amplitude spectrums derived from the source—receiver decomposition of the common-trace pairs cross-correlations. These operators are applied to both the initial and repeat surveys. The intent is that resolution is increased by whitening the spectrum and resolving lateral changes in source and receiver wavelet distortion. Repeatability is maintained by applying a single set of operators.

Figure 13:
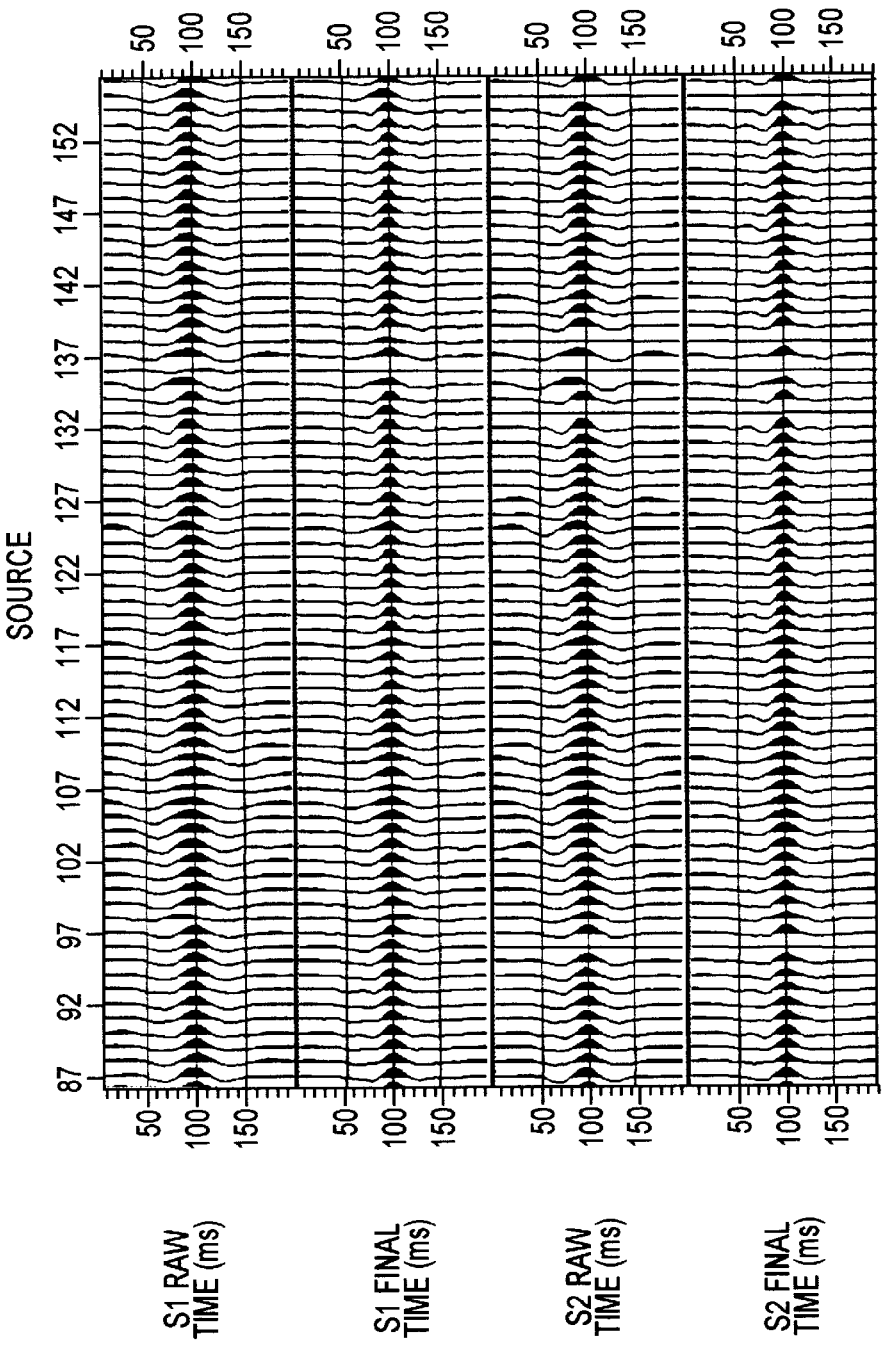
FIG. 13 illustrates the source decomposition of the common trace pair cross-correlations the for the S! and S2 source locations across a playa lakebed.
Figure 14:
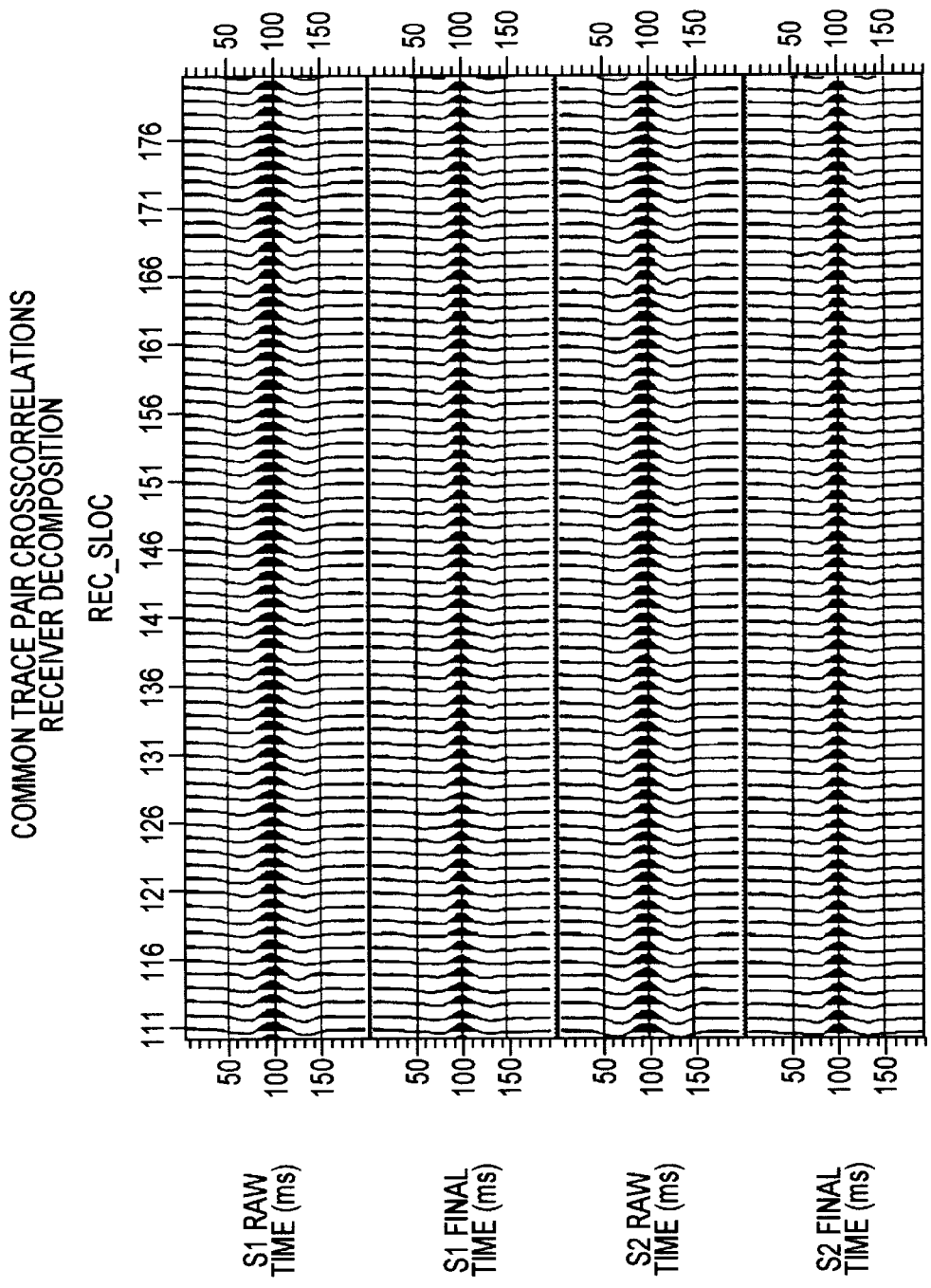
FIG. 14 illustrates the source decomposition of the common trace pair cross-correlations for receiver locations in the survey example.

Any remaining variation between the surveys can be estimated by repeating the common-trace pair cross-correlation and decomposition into source, receiver, CMP, azimuth and offset components. FIG. 13 shows the source decomposition of the common-trace pair cross-correlations for the S1 and S2 source locations across the playa lakebed. In FIG. 13, the first two rows of cross-correlation wavelets represent the S1 shear wave data, with and without the common-trace pair derived corrections. The bottom two rows represent the S2 shear wave data. The effect of the spectral distortion from this variation in near-surface properties can be seen at source 107 as a subtle broadening of the cross-correlation wavelet. FIG. 14 shows similar, before and after, results for receiver positions from another portion of the survey. The cross-correlation wavelet character is very stable, indicating that surface-consistent variations in bandwidth had been removed.

To reiterate, for time-lapse seismic surveys, data acquisition is repeated to obtain two or more recordings of seismic information over the survey area. The repeated surveys are separated in time during which some reservoir processes of interest (fluid injection, fluid withdrawal, pressure variation, fracturing, porosity redistribution, etc.) have occurred. These reservoir processes induce bulk rock property changes which affect the seismic wave propagation and can be detected to infer information about the reservoir processes. Variations in the data acquisition procedures, changes in ambient noise levels, changes in the material properties of the earth's near surface and even variations in the rock properties above the reservoir zone of interest are all forms of distortion, or noise, to be addressed in data processing. It is desirable to estimate and remove these distortions, thus improving the time-lapse image of the changes in bulk rock properties due to the reservoir processes of interest.

The foregoing discusses procedures for the derivation and analysis of cross-correlated, common source-receiver trace pairs in seismic data processing to:

1. Measure, quantify and derive corrections for amplitude and phase differences between time-lapse seismic surveys.

2. Obtain a measure of a spatially variant source, receiver, common-midpoint and offset component amplitude spectra, in the presence of ambient noise, representing spatial and temporal wavelet distortion to be removed in data processing.

3. Obtain a measure of spatially variant source and receiver amplitude coupling scalars.

With respect to the correct of phase and amplitude difference between time lapse seismic surveys, the processing method cross-correlates each common-trace pair between the initial and repeated seismic data volumes. The cross-correlation contains information about the common amplitude spectrum and phase spectrum of the trace pair, plus noise contamination. By decomposing these correlation wavelets into source, receiver, common-midpoint or offset components, the differences between the surveys can be estimated and a correction is derived. Once these corrections are derived and applied, essentially one of the time-lapse data volumes is corrected to the other. Ideally the two data volumes are identical, except for the different seismic response associated with the reservoir zone and the bulk rock property variations due to the reservoir processes. Remaining data processing procedures are performed on one volume but applied to both volumes to maintain consistency. From the final seismic images, differences in data attributes from the reservoir zone can be analyzed and interpreted to infer changes in bulk rock properties due to reservoir processes. This interpretation of the geophysical data is integrated with the geological, petrophysical and petroleum engineering data to form a dynamic model of the reservoir to be used in reservoir management.

What is claimed is:

1. A method for processing: (I) a first seismic image of a sub-surface volume of interest that has a first trace and was produced at a first time, and (ii) a second seismic image of substantially the same sub-surface volume that has a second trace and was produced at a second time that followed said first time by a span of time during which there was likely to be a change in the sub-surface volume of interest, to produce a time-lapse image of the sub-surface volume of interest with reduced noise, the first and second traces forming a common trace pair, the method comprising:

cross-correlating the common trace pair to produce a correlation wavelet;

processing said correlation wavelet to identify differences between the first seismic image and the second seismic image;

decomposing said differences into a plurality of composite differences; and using at least one of said plurality of composite differences to reduce noise in a time lapse image.

2. A method, as claimed in claim 1, wherein:

said step of processing includes measuring similarities between the first trace and the second trace of the common trace pair.

3. A method, as claimed in claim 2, wherein:

said step of processing includes using said similarities to identify differences between the first trace and the second trace of the common trace pair.

4. A method, as claimed in claim 1, wherein:

at least one of said composite differences is associated with one of the following for the first and second traces: the source position, the receiver position, the source to receiver offset, the source to receiver azimuth and the source to receiver image point.

5. A method, as claimed in claim 1, wherein:

said composite differences include a combination of the following for the first and second traces: the source position, the receiver position, the source to receiver offset, the source to receiver azimuth and the source to receiver image point.

6. A method, as claimed in claim 1, wherein:

said composite differences include each of the following for the first and second traces: the source position, the receiver position, the source to receiver offset, the source to receiver azimuth and the source to receiver image point.

7. A method, as claimed in claim 1, wherein:

said step of cross-correlating includes excluding changes due to the processes involving the sub-surface volume of interest.

8. A method, as claimed in claim 7, wherein:

said step of cross-correlating includes using a time-offset window.

9. A method, as claimed in claim 1, wherein:

said step of using includes applying one of said plurality of composite differences to one of the first seismic image and the second seismic image.

10. A method for processing: (i) a first seismic image of a sub-surface volume of interest that has a first trace and was produced at a first time, and a second seismic image of substantially the same sub-surface volume that has a second trace and was produced at a second time that followed said first time by a span of time during which there was likely to be a change in the sub-surface volume of interest, to produce an image of the sub-surface volume of interest with reduced noise, the first and second traces forming a common trace pair, the method comprising:

cross-correlating the common trace pair to produce a correlation wavelet;

decomposing said correlation wavelet to obtain a composite source amplitude and phase spectrum;

using said composite source amplitude and phase spectrum to reduce distortion caused by the near surface in an image of the sub-surface volume of interest.

11. A method, as claimed in claim 1, wherein:

said step of using includes inputting said composite source amplitude and phase spectrum to a deconvolution process.

12. A seismic data processing method for producing an improved time-lapse image of changes in the bulk rock properties associated with a reservoir due to the reservoir process of interest, the method for use with time-lapse imaging that involves:

first performing a first seismic survey of the reservoir at a first time;

wherein said step of first performing including providing a source of seismic energy at a source location and a receiver of seismic energy at a receiver location;

wherein said step of first performing includes using said source of seismic energy to propagate seismic energy through the rock associated with the reservoir;

wherein said step of first performing includes using said receiver to receive the seismic energy that has propagated through the rock and produce a first signal representative thereof;

wherein said first signal associated with said source and receiver is referred to as a first trace;

second performing a second seismic survey of the reservoir at a second time with said source of seismic energy at said source location and said receiver of seismic energy at said receiver location;

wherein said step of second performing includes using said source of seismic energy to propagate seismic energy through the rock associated with the reservoir;

wherein said step of second performing includes using said receiver to receive the seismic energy that has propagated through the rock and produce a second signal representative thereof;

wherein said second signal associated with said source and receiver is referred to as a second trace;

wherein said second seismic survey is likely to be subject to at least one distortion that was not associated with said first seismic survey;

wherein said first trace and said second trace form a trace pair, the method comprising:

measuring similarities between said first trace and said second trace;

using said similarities to identify differences between said first trace and said second trace;

removing at least one of said differences to produce an improved time-lapse image of the changes in the bulk rock properties associated with the reservoir between said first time and said second time that are due to the receiver process of interest.

* * * * *